United States Patent
Wang et al.

(10) Patent No.: US 11,208,332 B2
(45) Date of Patent: *Dec. 28, 2021

(54) RECOVERY OF MINING PROCESSING PRODUCT USING BORONIC ACID-CONTAINING POLYMERS

(71) Applicant: Ecolab USA Inc., St. Paul, MN (US)

(72) Inventors: Jing Wang, Aurora, IL (US); Kevin O'Brien, Saint Charles, IL (US); Mingli Wei, Naperville, IL (US); Weiguo Cheng, Naperville, IL (US); Jinfeng Wang, Aurora, IL (US); Kevin McDonald, North Aurora, IL (US); Xinyu C. Huang, Naperville, IL (US)

(73) Assignee: Ecolab USA Inc., St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/587,775

(22) Filed: Sep. 30, 2019

(65) Prior Publication Data

US 2020/0024148 A1 Jan. 23, 2020

Related U.S. Application Data

(63) Continuation of application No. 14/960,129, filed on Dec. 4, 2015, now Pat. No. 10,427,950.

(51) Int. Cl.
*C01F 7/46* (2006.01)
*C01F 7/06* (2006.01)
(Continued)

(52) U.S. Cl.
CPC ............... *C01F 7/46* (2013.01); *B01D 21/01* (2013.01); *C01F 7/0653* (2013.01); *C01F 7/145* (2013.01);
(Continued)

(58) Field of Classification Search
CPC . C01F 7/46; C01F 7/0653; C08J 3/246; C08J 2305/02; C08J 2343/00;
(Continued)

(56) References Cited

U.S. PATENT DOCUMENTS

| 2,181,695 A | 11/1939 | Given |
| 2,184,703 A | 12/1939 | Spangenberg |

(Continued)

FOREIGN PATENT DOCUMENTS

| AU | 199895203 B2 | 7/1999 |
| AU | 737191 B2 | 8/2001 |

(Continued)

OTHER PUBLICATIONS

Examination Report in Australian Application No. 2016364849, dated Mar. 20, 2020, 4 pages.
(Continued)

*Primary Examiner* — James C Goloboy
(74) *Attorney, Agent, or Firm* — Kagan Binder, PLLC

(57) ABSTRACT

Methods and compositions for improving performance of flocculants in an industrial production process. Methods include pH triggered cross-linking reaction between a flocculating agent, such as dextran, and a composition comprising a boronic acid-containing polymer. The pH trigger can be provided by a fluid having a pH of 8 or more. The production process can be a Bayer Process and the fluid is caustic liquor or slurry in the fluid circuit of the Bayer, wherein the reaction time is reduced over conventional methods and the cross-linked dextran composition effectuates improved flocculation of the trihydrate particles.

19 Claims, 2 Drawing Sheets

(51) Int. Cl.
*C08F 230/06* (2006.01)
*C01F 7/14* (2006.01)
*C01F 7/47* (2006.01)
*B01D 21/01* (2006.01)
*C08J 3/24* (2006.01)

(52) U.S. Cl.
CPC ............... *C01F 7/148* (2013.01); *C01F 7/47* (2013.01); *C08F 230/06* (2013.01); *C08J 3/246* (2013.01); *C08J 2305/02* (2013.01); *C08J 2343/00* (2013.01); *C08J 2405/02* (2013.01); *C08J 2443/00* (2013.01)

(58) Field of Classification Search
CPC ... C08J 2405/02; C08J 2443/00; B01D 21/01; C08F 230/06
See application file for complete search history.

(56) References Cited

U.S. PATENT DOCUMENTS

| | | |
|---|---|---|
| 2,257,347 A | 9/1941 | Raymer |
| 2,935,377 A | 5/1960 | Jones |
| 3,085,853 A | 4/1963 | Lesinski et al. |
| 3,390,959 A | 7/1968 | Sibert |
| 3,397,953 A | 8/1968 | Galvin et al. |
| 3,445,187 A | 5/1969 | Sibert |
| 3,541,009 A | 11/1970 | Arendt et al. |
| 3,575,868 A | 4/1971 | Galvin et al. |
| 3,642,437 A | 2/1972 | Angstadt et al. |
| 3,681,012 A | 8/1972 | Sibert |
| 3,728,432 A | 4/1973 | Petitjean et al. |
| 3,770,808 A | 11/1973 | Marquis et al. |
| 4,001,210 A | 1/1977 | Engelskirchen et al. |
| 4,013,821 A | 3/1977 | Engelskirchen et al. |
| 4,096,326 A | 6/1978 | Reid |
| 4,159,255 A | 6/1979 | Gainer et al. |
| 4,215,094 A | 7/1980 | Inao et al. |
| 4,256,709 A | 3/1981 | Sizyakov et al. |
| 4,267,064 A | 5/1981 | Sasaki et al. |
| 4,339,331 A | 7/1982 | Lim et al. |
| 4,478,795 A | 10/1984 | Hereda et al. |
| 4,512,959 A | 4/1985 | Pohland et al. |
| 4,523,010 A | 6/1985 | Lukach et al. |
| 4,576,942 A | 3/1986 | Youssefyeh |
| 4,608,237 A | 8/1986 | Roe et al. |
| 4,737,352 A | 4/1988 | Owen et al. |
| 4,767,540 A | 8/1988 | Spitzer et al. |
| 4,789,485 A | 12/1988 | Field et al. |
| 5,008,089 A * | 4/1991 | Moody ............... C01F 7/0653 209/5 |
| 5,021,179 A | 6/1991 | Zehler et al. |
| 5,030,340 A | 7/1991 | Panzer et al. |
| 5,041,269 A | 8/1991 | Moody et al. |
| 5,049,612 A | 9/1991 | Bulatovic et al. |
| 5,091,159 A | 2/1992 | Connelly et al. |
| 5,106,599 A | 4/1992 | Roe |
| 5,217,620 A | 6/1993 | Mahoney et al. |
| 5,275,628 A | 1/1994 | Dimas et al. |
| 5,286,391 A | 2/1994 | Malito et al. |
| 5,290,465 A | 3/1994 | Sabahi |
| 5,346,628 A | 9/1994 | Sommese et al. |
| 5,387,405 A | 2/1995 | Connelly et al. |
| 5,415,782 A | 5/1995 | Dimas |
| 5,463,037 A | 10/1995 | Kiyose et al. |
| 5,478,477 A | 12/1995 | Ramesh et al. |
| 5,516,435 A | 5/1996 | Lewellyn |
| 5,534,235 A | 7/1996 | Reed et al. |
| 5,601,726 A | 2/1997 | Cole |
| 5,711,923 A | 1/1998 | Harris et al. |
| 5,716,530 A | 2/1998 | Strominger et al. |
| 5,837,215 A | 11/1998 | Tippett et al. |
| 5,853,677 A | 12/1998 | Avotins et al. |
| 5,951,955 A | 9/1999 | Flieg et al. |
| 6,033,579 A | 3/2000 | Riemer et al. |
| 6,048,463 A | 4/2000 | Selvarajan et al. |
| 6,168,767 B1 | 1/2001 | Welton et al. |
| 6,210,585 B1 | 4/2001 | Tippett et al. |
| 6,365,116 B1 | 4/2002 | Barham et al. |
| 6,599,489 B2 | 7/2003 | Mahoney et al. |
| 6,605,674 B1 | 8/2003 | Whipple et al. |
| 6,652,902 B2 | 11/2003 | Hubbell et al. |
| 6,669,852 B2 | 12/2003 | Ishikawa et al. |
| 6,726,845 B1 | 4/2004 | Barham et al. |
| 6,740,249 B1 | 5/2004 | Barham |
| 6,814,873 B2 | 11/2004 | Spitzer et al. |
| 6,821,440 B2 | 11/2004 | Gallagher et al. |
| 7,264,729 B2 | 9/2007 | Yawn |
| 7,666,373 B2 | 2/2010 | Rosenberg |
| 7,704,471 B2 | 4/2010 | Tizon et al. |
| 7,771,681 B2 | 8/2010 | Kouznetsov et al. |
| 7,875,188 B2 | 1/2011 | Dymond et al. |
| 7,901,583 B2 | 3/2011 | Mccoll et al. |
| 7,943,713 B2 | 5/2011 | Pelton et al. |
| 7,976,820 B2 | 7/2011 | Liu et al. |
| 7,976,821 B2 | 7/2011 | Liu et al. |
| 8,216,534 B2 | 7/2012 | Ballentine et al. |
| 8,252,266 B2 | 8/2012 | Chester et al. |
| 8,298,508 B2 | 10/2012 | Wang et al. |
| 8,708,045 B2 | 4/2014 | Ogle et al. |
| 8,778,140 B2 | 7/2014 | Cheng et al. |
| 8,926,939 B2 | 1/2015 | Kouznetsov et al. |
| 8,971,913 B2 | 3/2015 | Moeglein et al. |
| 9,034,145 B2 | 5/2015 | Castro et al. |
| 9,102,995 B2 | 8/2015 | Bode et al. |
| 9,174,852 B2 | 11/2015 | Chester et al. |
| 9,187,337 B2 | 11/2015 | Hanna et al. |
| 9,199,855 B2 | 12/2015 | Urbani et al. |
| 9,284,625 B2 | 3/2016 | Wang et al. |
| 10,427,950 B2 * | 10/2019 | Wang ............... C01F 7/46 |
| 2006/0191853 A1 | 8/2006 | Ballentine et al. |
| 2006/0272816 A1 | 12/2006 | Willberg et al. |
| 2008/0107578 A1 | 5/2008 | Wang et al. |
| 2008/0257827 A1 | 10/2008 | Dai et al. |
| 2009/0197781 A1 | 8/2009 | Sunkara |
| 2010/0029929 A1 | 2/2010 | Luczak et al. |
| 2010/0170856 A1 | 7/2010 | Branning |
| 2010/0224576 A1 | 9/2010 | Iannicelli |
| 2012/0004148 A1 * | 1/2012 | Ogle ............... C09K 8/12 507/213 |
| 2012/0034142 A1 | 2/2012 | Wang et al. |
| 2013/0012627 A1 | 1/2013 | Funston, Sr. |
| 2013/0112627 A1 * | 5/2013 | Urbani ............... C01F 7/145 210/727 |
| 2014/0221256 A1 | 8/2014 | Holtsclaw et al. |

FOREIGN PATENT DOCUMENTS

| | | |
|---|---|---|
| CA | 825234 A | 10/1969 |
| CA | 2014262 A1 | 4/1990 |
| CN | 104768627 A | 7/2015 |
| EP | 0465055 B1 | 4/1997 |
| GB | 1154993 A | 6/1969 |
| JP | H05155734 A | 6/1993 |
| JP | H06206752 A | 7/1994 |
| JP | 2015123417 A | 7/2015 |
| RU | 2309123 C2 | 10/2007 |
| WO | 97/38018 A1 | 10/1997 |
| WO | 1999029626 A1 | 6/1999 |
| WO | 2006108899 A1 | 10/2006 |
| WO | 2009085514 A2 | 7/2009 |
| WO | 2014105484 A1 | 7/2014 |
| WO | 2014158381 A1 | 10/2014 |
| WO | 2015047261 A1 | 4/2015 |

OTHER PUBLICATIONS

Office Action in Brazilian Application No. BR 112018010893-6, dated Feb. 11, 2020, 4 pages (Official Copy Only).

Office Action and Search Report in Chinese Application No. 201680070362.5, dated Jan. 3, 2020, 15 pages 15 pages (9 pages Official Copy, 6 pages English Translation).

(56) References Cited

OTHER PUBLICATIONS

Office Action in Chinese Application No. 201680070362.5, dated May 27, 2020, 7 pages (3 pages Official Copy, 4 pages English Translation).
Examination Report in Indian Application No. 201817018230, dated Mar. 13, 2020, 6 pages.
Office Action and Search Report in Russian Application No. 2018123570, dated Apr. 6, 2020, 12 pages (7 pages Official Copy, 5 pages English Translation).
Kim et al., "Swelling Properties of Hydrogels Containing Phenylboronic Acids," Chemosensors 2014, 2, 1-12; doi: 10.3990/chemosensors2010001.
Nishiyabu et al., "Boronic acid building blocks: tools for sensing and separation," Chem Commun. 2011, 47, 1106-1123, doi: 10.1039/c0cc02920c.
Roy et al., "Sugar-responsive block copolymers by direct RAFT polymerization of unprotected boronic acid monomers," ChemComm. 21(21):2477-9, doi: 10.1039/b802293c.
Mu-Shih Lin et al., Synthesis and characterizations of allyl cellulose and glycidyl cellulose, J. Polymer Science, Part A: Polymer Chemistry (1992), 30(11), pp. 2303-2312.
Yasuhiko Onishi et al., J. Applied Polymer Science, vol. 92, pp. 3022-3029 (2004).
X.Y. Zhang et al., Synthesis and characterization of 2,3-dihydroxypropyl cellulose, J. Macromolecular Science, Chemistry (1988), A25(8), pp. 955-970.
Kapusniak, Janusz et al., "Starch Based Depressors for Selective Flotation of Metal Sulfide Ores," Starch, vol. 51, No. 11-12, 2000, pp. 416-421.
Patil, Sachin, "Crosslinking of Polysaccharides: Methods and Applications" 2008, vol. 6 Issue 2, Pertinent pp. 1, and 6-7.
Termes, S. C. et al., "Insoluble crossslinked starch xanthate as a selective flocculant for sulfide minerals," Transactions of the American Institute of Mining, Metallurgical, and Petroleum Engineers, Society of Mining Engineers of AIME, vol. 274, 1983, pp. 1971-1977.
Johannes Fink, "Enhanced Oil Recovery", Petroleum Engineer's Guide to Oil Field Chemicals and Fluids, Second Edition, Gulf Professional Publishing, 2015, Chapter 16, 16.7 Polymer Waterflooding, p. 504.
International Search Report dated Feb. 20, 2017 for International Application No. PCT/US16/64602, 7 pages.
Written Opinion dated Feb. 20, 2017 for International Application No. PCT/US16/64602, 7 pages.
Examination Report in Indonesia Patent Application No. PID201803405, dated Jun. 22, 2020, 5 pages.

\* cited by examiner

RECOVERY OF MINING PROCESSING PRODUCT USING BORONIC ACID-CONTAINING POLYMERS

CROSS REFERENCE TO RELATED APPLICATIONS

This application is a continuation of U.S. Non-provisional application Ser. No. 14/960,129 filed Dec. 4, 2015.

STATEMENT REGARDING FEDERALLY SPONSORED RESEARCH OR DEVELOPMENT

Not Applicable

FIELD OF THE INVENTION

The present disclosure generally relates to methods and compositions for improving performance of flocculant additives used in industrial processes. More particularly, to improving the use of flocculant additives, such as dextran, by pH triggered crosslinking of the flocculant additives with boronic acid-containing polymers.

BACKGROUND OF THE INVENTION

Aluminum ore ("bauxite") is considered the main source of aluminum. On an industrial scale, bauxite is first processed into aluminium oxide (also known as "aluminium (III) oxide", "aluminum hydroxide", "alumina trihydrate" and "alumina"), which is then converted to aluminium metal. The principle means of refining bauxite and producing aluminum hydroxide at the industrial scale is by the well-established method of the Bayer process.

In general, the Bayer process typically comprises: a digestion stage, wherein alumina is extracted by digesting the bauxite ore in a solution of sodium hydroxide solution ("caustic" or "caustic solution") forming an aqueous sodium aluminate solution; a clarification stage, wherein solid phase residue ("red mud" or "bauxite residue) is removed, via sedimentation and filtering, from the pregnant liquor (supersaturated in sodium aluminate), leaving sodium aluminate in solution; a precipitation stage, wherein aluminum hydroxide is precipitated from the sodium aluminate solution ("liquor" or "Bayer Process liquor") and grown in the form of aluminum hydroxide crystals (crystallization); a classification stage, wherein crystal seeds are separated from the aluminum hydroxide product material; and then a calcination stage, wherein the aluminium hydroxide decomposes to aluminium oxide, the alumina end product. More detailed descriptions of the Bayer Process and its process steps are readily available. For example, a more detailed, but not comprehensive, description of the Bayer Process step can be found in U.S. Pat. No. 8,298,508, which is herein incorporated by reference in its entirety.

Production of alumina is energy intensive and costly. Despite using the Bayer Process for well over a century, there are still many challenges to improve the process. With lower grade ore, greater mineral complexity and environmental concerns, process optimizations that can maximize product yield, conserve energy, and minimize operational costs are pursued on an ongoing basis. Attempts to meet the targets above are faced with many complicating factors including impurity levels in liquor, caustic embrittlement at higher concentration. Moreover, specific techniques employed in industry for the various steps of the process can vary from plant to plant, making consistent improvements difficult.

Particular areas of focus for process optimization include maximizing liquor productivity/yield and reducing energy usage. This includes the precipitation stage, wherein the precipitated solid aluminum hydroxide is collected as product through the application of multiple precipitation and flocculation steps of the clarified sodium aluminate liquor. Maximizing the output of aluminate crystals during this stage is important in the economic recovery of aluminum values by the Bayer process.

Bayer process operators strive to optimize their crystal formation and precipitation methods so as to produce the greatest possible product yield from the Bayer process while producing crystals of a given particle size distribution. Relatively large particle sizes are beneficial to subsequent processing steps required to recover aluminum metal. Undersized alumina trihydrate crystals, or fines, generally are not used in the production of aluminum metal, but instead are recycled for use as fine particle alumina trihydrate crystal seed. As a consequence, the particle size of the precipitated trihydrate crystals determines whether the material is to be ultimately utilized as product (larger crystals) or as seed (smaller crystals). The classification and capture of the different sized trihydrate particles is therefore an important step in the Bayer process.

This separation or recovery of alumina trihydrate crystals as product in the Bayer process, or for use as precipitation seed, is generally achieved by one of multiple techniques, including one or a combination of settling, cyclones, filtration and/or a combination of these techniques. Coarse particles settle easily, while fine particles settle slowly. Typically, plants will use two or three steps of settling in order to classify the trihydrate particles into different size distributions corresponding to product and seed. In particular, in the final step of classification a settling vessel is often used to capture and settle the fine seed particles. The overflow of the last classification stage is returned to the process as spent liquor to be used back in digestion. Trihydrate particles reporting to the overflow in this final settling stage are typically not utilized within the process for either seed or product. Effectively such material is recirculated within the process, creating inefficiencies.

Particle size of the precipitated trihydrate crystals obtained in the classification step and capture of trihydrate particles, whether the material is to be ultimately utilized as product or as seed, and the minimization of aluminum trihydrate fines in the overflow are direct contributors to the quality and quantity of alumina output. As such, achieving further process efficiencies in this area is an ongoing pursuit.

In efforts to improve the efficiency of the aluminum trihydroxide separation process, certain compounds, including various flocculants, that are soluble or dispersible in the process liquid, such as dextran, a polysaccharide, are added as a process additive. Conventional technology employs the addition of synthetic water soluble polyacrylate flocculants and/or dextran flocculants to enhance settling characteristics of the alumina trihydrate particles in the classification process and thus, reduce the amount of solids in the spent liquor. Cross-linked dextran or cross-linked dihydroxypropyl cellulose are also employed to enhance the settling of fine alumina trihydrate crystals. While such treatments, including flocculant compositions, are often used in the trihydrate classification systems of Bayer plants, some require extensive formulation time and have restricted usage and delivery costs, which altogether negatively impact efficiency and contribute to cost.

Despite the continuous and ongoing development of methods suitable for obtaining aluminum hydroxide crystals with increased particle size, there is still a desire for improvements and enhancements for the aluminium hydroxide production process to address production quality and economic concerns. There is need and utility for methods of and compositions for enhancing particle capture and settling rates, while minimizing the concentration of solids in the overflow after the last stage of classification. Together, these improvements increase process efficiencies, reduce preparation time and material usage, and provide flexibility in application.

The art described in this section is not intended to constitute an admission that any patent, publication or other information referred to herein is "prior art" with respect to this invention, unless specifically designated as such. In addition, this section should not be construed to mean that a search has been made or that no other pertinent information as defined in 37 CFR § 1.56(a) exists.

SUMMARY OF THE INVENTION

In at least one embodiment, the invention relates to methods and compositions for improving flocculant effectiveness and efficiency in industrial processes. Methods include pH triggered instantaneous cross-linking reaction between a flocculating agent, such as a polysaccharide, for example dextran, and a composition comprising a boronic acid-containing polymer. The pH trigger can be provided by the inherent alkalinity of the process fluid to be treated, allowing for on-site and in situ preparation and cross-linking, thereby increasing efficiency and lowering production costs.

In at least some embodiments, the present invention includes a method for solid-liquid separation in a mining process for production of a mining product at a production site. The method includes combining a first composition comprising a flocculating agent and a second composition comprising a boronic acid-containing polymer to form a mixture. The method further includes triggering a cross-linking reaction between the flocculating agent and the boronic acid-containing polymer by exposing the mixture to a pH level of 8 or more, thereby forming a reaction product. In some embodiments, the pH level is 10 or more. The reaction product is used at the production site as a flocculant in a fluid stream of the mining process at one or more locations where solid-liquid separation occurs.

In these and other various exemplary embodiments, the method can further include introducing the reaction product into the fluid stream. In some embodiments, the reaction product is introduced by feeding the reaction product into the fluid stream, wherein the cross-linking reaction is triggered at the production site before feeding. In some embodiments, the reaction product is introduced by feeding the mixture into the fluid stream, wherein the cross-linking reaction is triggered in the fluid stream (in situ), which has a pH of 8 or more. In some embodiments, the reaction product is introduced by feeding the first and second compositions into the fluid stream, wherein the mixture is formed in the fluid stream (in situ) and the cross-linking reaction is triggered by the pH of the fluid stream (8 or more) to form the reaction product.

In various embodiments, the mining or production process is a Bayer Process for the production of alumina from bauxite ore and the fluid is caustic liquor or slurry in the fluid circuit of the Bayer. In some embodiments, the methods and compositions relate to the use of the product of a pH triggered cross-linking of the flocculation agent, which can be a polysaccharide, such as dextran, with the boronic acid-containing polymer as a trihydrate flocculant. The flocculant improves the performance of unit operations and enhances the settling of fine alumina trihydrate crystals (lower overflow solids) in caustic Bayer liquor. The pH triggered cross-linking reaction between dextran and the boronic acid-containing polymer for aluminium trihydrate solid flocculation in the caustic Bayer liquor is instantaneous. This allows for the on-site or in situ formulation and application. This represents a significant reduction in time relative to techniques for the conventional cross-linking of dextran and increases concentration of the active component in the final product, and thereby effectively reduces transportation costs.

In at least some embodiments, the production process is a Bayer process for production of alumina. The flocculating agent, in some embodiments a polysaccharide, and the second composition comprising the boronic acid-containing polymer are mixed and combined with an amount of liquor or slurry having a pH of at least 8, and in some embodiments 10, from the Bayer process. Upon combining, the pH level triggers an instantaneous cross-linking reaction between the polysaccharide and the boronic acid-containing polymer to form a reaction product for use in the fluid stream of the Bayer process at one or more locations where solid-liquid separation occurs. In some embodiments, the polysaccharide is dextran. In further embodiments, the boronic acid-containing polymer is in the form of a latex, an aqueous solution or a dry powder.

In at least one embodiment, the amount of liquor or slurry being removed from the fluid stream and then combined with the first and second compositions, where after the combination is added into a fluid stream location of the Bayer Process; or the first and second compositions are combined with the amount of liquor or slurry in a fluid stream location of the Bayer Process.

In these and various other embodiments, the boronic acid-containing polymer is the reaction product of polymerization of at least one water soluble vinyl monomer and at least one vinyl monomer containing a boronic acid moiety, which, in various embodiments, is phenylboronic acid.

In these and various other embodiments, the at least one vinyl monomer containing a boronic acid moiety can be chosen from the group consisting of 3-(Acrylamido)phenylboronic acid, 4-(acrylamido)phenylboronic acid, 2-(acrylamide)phenylboronic acid, 4-Vinylphenylboronic acid, 3-vinylphenylboronic acid, 2-vinylphenylboronic acid and mixtures thereof. In some embodiments, the at least one water soluble vinyl monomer can be an acrylate monomer or can be chosen the from the group consisting of acrylamide; acrylic acid or its salts; 2-Acrylamido-2-methylpropane sulfonic acid or its salts; N,N,N-Trimethyl-2-[(1-oxo-2-propenyl)oxy]-ethanaminium chloride, N,N-dimethyl-N-propenyl-2-propen-1-aminium chloride and mixtures thereof.

In at least one embodiment, the vinyl monomer containing a boronic acid moiety is 3-(Acrylamido)phenylboronic acid. In this and various other embodiments, the water soluble vinyl monomer is acrylamide. In at least one embodiment, the boronic acid-containing polymer is a water soluble boronic acid-containing polyacrylamide.

In these and various other embodiments, the boronic acid-containing polymer has a reduced specific viscosity of at least about 0.2 dl/g. In this and various other embodiments, the boronic acid-containing polymer can comprise at least 0.01 wt % boronic acid monomer. In some embodiments, the mixture of the first and second compositions comprises at least 0.01 wt % boronic acid-containing polymer.

In these and various other embodiments, the boronic acid-containing polymer can comprise at least 0.01 wt % boronic acid monomer. In further embodiments, the boronic acid-containing polymer can comprise about 1.0 wt % to about 2.0 wt % boronic acid monomer and, in some embodiments, comprise at least about 0.01 wt % of the mixture.

In these and various other embodiments, the cross-linking reaction can have a reaction time of about 30 minutes or less.

In these and various other embodiments, the boronic acid-containing polymer can comprise a biopolymer, synthetic polymer or mixtures thereof. In some embodiments, the boronic acid-containing polymer is water soluble boronic acid-containing polyacrylamide. The polyacrylamide can be prepared from radical polymerization of acrylamide and at least one vinyl monomer containing a boronic acid moiety. In further embodiments, the boronic acid-containing polymer can be polymerized using a monomer chosen from the group consisting of acrylic acid or its salts, 2-Acrylamido-2-methylpropane sulfonic acid (AMPS) or its salts, 2-(acryloyloxy)-N,N,N-trimethylethanaminium (DMAEA.MCQ). In some embodiments, the boronic acid monomer is 3-(acrylamido)phenylboronic acid (APBA). In various embodiments, the boronic acid-containing polymer is nonionic, anionic, cationic, amphoteric, or associative. The boronic acid-containing polymer can be linear or non-linear; and cross-linked or non-cross-linked. In some embodiments, the boronic acid-containing polymer is in latex form, aqueous solution, or dry powder form.

In some embodiments of the invention, the reaction product is introduced into liquor of the Bayer process, thereby improving yield of alumina trihydrate sequestration from an alumina trihydrate process. The reaction product can be introduced to liquor of the Bayer process at one more locations and thereby effectuate improved flocculation of trihydrate particles over use of non-cross-linked dextran. The reaction product can further be introduced to liquor of the Bayer process at one more locations and thereby inhibit the rate of nucleation of one or more alumina trihydrate crystals in the process. The invention further includes embodiments, wherein the reaction product can be introduced to the liquor or slurry of the Bayer process at one or more locations to facilitate red mud clarification in the process.

In at least one embodiment, there is disclosed a method directed towards precipitation of alumina trihydrate in the Bayer process. The method comprises adding an effective amount of a trihydrate flocculant to Bayer process liquor of the Bayer process. The trihydrate flocculant is prepared by combining a polysaccharide, a boronic acid-containing polymer and an amount of liquor or slurry to form a cross-linked reaction product. In some embodiments, the polysaccharide is dextran and the reaction product is pH triggered by the liquor or slurry, crosslinking of the dextran with the boronic acid-containing polymers. The necessary pH level for triggering the crosslinking can be the level found in the Bayer process liquor or slurry. The use of the trihydrate flocculant results in improved flocculation of alumina trihydrate particles and reduced overflow of solids.

At least one embodiment of the invention is directed towards a method for settling alumina trihydrate in a Bayer process system. The method comprises adding to the system an effective amount of cross-linked dextran. The cross-linking is the result of reacting the dextran with a boronic acid-containing polymer composition comprising boronic acid-containing polymers in situ, wherein the dextran and the boronic acid-containing polymer composition are combined in a solution having a pH level and the cross-linking reaction is triggered by the pH level. In some embodiments, the solution is an amount of Bayer process liquor from the system. In these and various other embodiments, the dextran and the boronic acid-containing polymer composition are combined in the Bayer process system fluid stream. The use of such a cross-linked dextran/boronic acid containing polymer flocculants results in improved settling of alumina trihydrate when compared to the use of conventional flocculants employed in this process.

The solution of dextran cross-linked with boronic acid-containing polymer may be added to the Bayer process liquor in a trihydrate classification circuit of an alumina production process. The solution can be added to the liquor at one or more locations in the process where solid-liquid separation occurs. The addition locations can facilitate inhibiting the rate of nucleation of one or more alumina trihydrate crystals in the process. The addition location can facilitate reducing the rate of scale formation in the process. The solution can further improve the yield of alumina trihydrate sequestration.

In the above and other various embodiments, the Bayer process is performed at an alumina production facility and the crosslinking of dextran with boronic acid-containing polymers is performed at the alumina production facility. In various embodiments, the crosslinking is performed in an amount of the Bayer process liquor. In some embodiments, the dextran is cross-linked with the boronic acid-containing polymers in an amount of Bayer process caustic liquor solution removed from the Bayer process fluid stream and thereafter added to the Bayer process fluid stream. In some embodiments, the dextran composition and boronic acid-containing polymers composition are combined and added to the Bayer process fluid stream.

In these and various embodiments, the crosslinking of the flocculation agent, such as dextran, with boronic acid-containing polymers significantly reduces the production time required for cross-linking of dextran as compared to cross-linking with conventional agents, for example those using epichlorohydrin. The pH levels of the caustic Bayer process liquor triggers instantaneous cross-linking reaction between dextran and boronic acid-containing polymers for aluminum trihydrate solid flocculation. In some embodiments, the cross-linking time in preparation of the improved flocculant is 1-30 minutes, as compared to commercial products, which is 1-20 hours. The crosslinking of dextran with boronic acid-containing polymers can further increase product active concentration, reducing transportation and total product cost.

Further advantages of the compositions and methods of the present invention include, but are not limited to, a reduction in the costs associated with the aluminium hydroxide product process, while enhancing the efficiency and effectiveness of the aluminum hydroxide production process. The present methods and compositions aid in maximizing the efficiency of the process and achieve the lowest possible concentration of solids in the overflow of the last stage of classification.

The crosslinking of dextran with boronic acid-containing polymers at an alumina production facility to produce a trihydrate flocculant for use in the precipitation of alumina trihydrate in a Bayer process is further advantageous in that it can result in greater flocculation effectiveness, shorter reaction time, increase of the maximum effective dosage, faster settling and better shear resistance of the trihydrate flocculant. The crosslinking of dextran with boronic acid-containing polymers on-site or in situ, at an alumina production facility, further provides for lower transportation and process costs.

In at least one embodiment, the mining process is an iron ore process and the solid-liquid separation is the separation of iron ore tailing. Similarly, the method comprises combining the flocculating agent and the second composition comprising the boronic acid-containing polymer to form a mixture; and triggering a cross-linking reaction between the flocculating agent and the boronic acid-containing polymer by exposing the mixture to a pH level of 8 or more, thereby forming a reaction product. The reaction product is used at the production site as a flocculant in a fluid stream of the iron ore process at one or more locations where solid-liquid separation occurs.

The method above similarly further comprises feeding the reaction product into the fluid stream, wherein the cross-linking reaction is triggered at the production site before the feeding; feeding the mixture into the fluid stream, the fluid stream having a pH level of 8 or more, wherein the cross-linking reaction is triggered in the fluid stream; or feeding the first and second compositions into the fluid stream, the fluid stream having a pH level of 8 or more, wherein the mixture is formed and the cross-linking reaction is triggered in the fluid stream. As described above, the boronic acid-containing polymer comprises the reaction product of polymerization of at least one water soluble vinyl monomer and at least one vinyl monomer containing a boronic acid moiety.

In at least one embodiment, the present invention includes a flocculant composition for solid-liquid separation in a Bayer process for production of alumina. The flocculant comprises a pH triggered cross-linking reaction product of a cross-linking reaction between a flocculating agent and a boronic acid-containing polymer. The cross-linking reaction being triggered by exposing a mixture of the flocculating agent and the boronic-acid-containing polymer to a pH level of 8 or more, wherein the boronic acid-containing polymer is the reaction product of polymerization of at least one water soluble vinyl monomer and at least one vinyl monomer containing a boronic acid moiety.

In some embodiments, the boronic acid-containing polymer has a reduced specific viscosity of at least about 0.2 dl/g and comprises at least about 0.01 wt % boronic acid monomer. In this and various other embodiments, the boronic acid-containing polymer can comprise about 1.0 wt % to about 2.0 wt % boronic acid monomer and comprise at least about 0.01 wt % of the mixture. In still further embodiments, the boronic acid-containing polymer comprises 0.10 wt % to about 10 wt % of the mixture and the cross-linking reaction has a reaction time of about 30 minutes or less. In at least some embodiments, the flocculant composition is useful for enhancing the production of crystal agglomerates from a precipitation liquor crystallization process.

In at least one embodiment, there is disclosed herein a commercial package containing a composition comprising a boronic acid-containing polymer and printed material. The printed material indicates the use of the composition as a solid-liquid separation additive in a mining process. In some embodiments, the printed material indicates that the boronic acid-containing polymer is the reaction product of polymerization of at least one water soluble vinyl monomer and at least one vinyl monomer containing a boronic acid moiety.

The printed material can further provide or direct a user to instructions for use of the composition. The instructions can indicate a method for solid-liquid separation in a mining process for production of a mining product at a production site, as is disclosed herein.

In at least some embodiments, the instructions indicate that the method comprises combining a first composition comprising a flocculating agent and the composition comprising the boronic acid-containing polymer to form a mixture. The indicated method further comprises triggering a cross-linking reaction between the flocculating agent and the boronic acid-containing polymer by exposing the mixture to a pH level of 8 or more, thereby forming a reaction product. The instructions can further indicate that the reaction product is used at the production site as a flocculant in a fluid stream of the mining process at one or more locations where solid-liquid separation occurs.

In at least some embodiments, the instructions further indicate that the method comprises: feeding the reaction product into the fluid stream, wherein the cross-linking reaction is triggered at the production site before the feeding; feeding the mixture into the fluid stream, the fluid stream having a pH level of 8 or more, wherein the cross-linking reaction is triggered in the fluid stream; or feeding the first and second compositions into the fluid stream, the fluid stream having a pH level of 8 or more, wherein the mixture is formed and the cross-linking reaction is triggered in the fluid stream.

In these and other various embodiments, the mining process is a Bayer process and the mining product is alumina. The printed material indicates the use of the composition as a solid-liquid separation additive in the Bayer process and the instructions indicate a method for solid-liquid separation in the Bayer process for production of alumina at an alumina production site. In other various embodiments, the mining process is an iron ore process. The printed material indicates the use of the composition as a solid-liquid separation additive in the iron ore process and the instructions indicate a method for solid-liquid separation in the iron ore process at an iron production site.

The above summary of various aspects of the disclosure is not intended to describe each illustrated aspect or every implementation of the disclosure. Still other objects and advantages of the present invention and methods of construction of the same will become readily apparent to those skilled in the art from the following detailed description. As will be realized, the invention is capable of other and different embodiments and methods of construction, and its several details are capable of modification in various obvious respects, all without departing from the invention. Accordingly, the drawings and description are to be regarded as illustrative in nature, and not as restrictive.

BRIEF DESCRIPTION OF THE DRAWINGS

A detailed description of the invention is hereafter described with specific reference being made to the drawings, in which.

Figure 1:
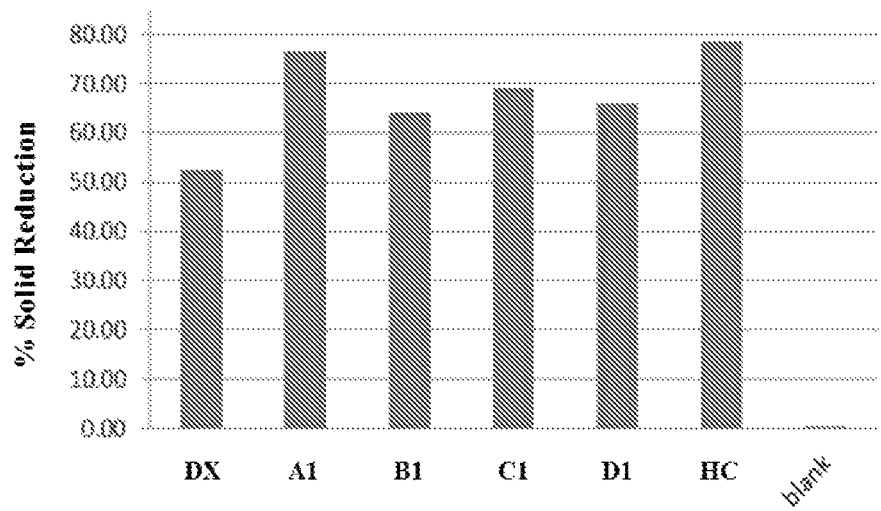
FIG. 1 is a graph showing results from a comparison of samples in an overflow solids reduction test.

While the present invention is amenable to various modifications and alternative forms, specifics thereof have been shown by way of example in the drawings and will be described in detail. It should be understood, however, that the intention is not to limit the present invention to the particular aspects described. On the contrary, the intention is to cover all modifications, equivalents, and alternatives falling within the spirit and scope of the present invention as defined by the appended claims.

DETAILED DESCRIPTION

While this invention may be embodied in many different forms, there are described in detail herein specific embodiments of the invention. This description is an exemplification of the principles of the invention and is not intended to limit the invention to the particular embodiments illustrated.

The following are definitions that apply to the relevant terms as used throughout this specification. The organization of the definitions is for convenience only and is not intended to limit any of the definitions to any particular category.

"Consisting Essentially of" means that the methods and compositions may include additional steps, components, ingredients or the like, but only if the additional steps, components and/or ingredients do not materially alter the basic and novel characteristics of the claimed methods and compositions.

"Dextran" is an α-D-1,6 glucose-linked glucan with side chains 1-3 linked to the backbone units of the biopolymer.

"Dihydroxypropyl cellulose" is a cellulose derivative with the addition of 1,2-dihydroxypropyl ether group to the cellulose backbone.

"Liquor" or "Bayer Liquor" means caustic, liquid medium that has run through at least a portion of a Bayer process in an industrial facility.

"Precipitation Feed Liquor" means the precipitation liquor that flows into a precipitator of an aluminum hydroxide precipitation process.

"Precipitation Liquor" means aluminate containing liquor in an aluminum hydroxide precipitation step of an alumina production process. The aluminate liquor may be referred to as various terms known to those of ordinary skill in the art, for example, pregnant liquor, green liquor, and aluminum hydroxide precipitation feed. The Bayer process is one example of an alumina production process. The term precipitation liquor may also include the aluminate solution directed to decomposition in a sintering-carbonation process or combined Bayer-sintering process as accomplished by the methods well known to those skilled in the art as described, for example, in U.S. Pat. Nos. 4,256,709, 3,642,437, 2,184,703, 2,257,347, and 2,181,695.

"Product yield" means the amount of aluminum hydroxide solid content within the precipitating vessel at the end of a precipitation run. An increased product yield is generally indicated by a lower liquor aluminum hydroxide concentration for the corresponding vessel. "Slurry" means a mixture comprising a liquid medium within which fines (which can be liquid and/or finely divided solids) are dispersed or suspended, when slurry is sparged, the tailings remain in the slurry and at least some of the concentrate adheres to the sparge bubbles and rises up out of the slurry into a froth layer above the slurry, the liquid medium may be entirely water, partially water, or may not contain any water at all "Spent Liquor" refers to liquor resulting from the removal of precipitated aluminum values after the final classification stage that returns back to digestion in the Bayer process.

"Reduced Specific Viscosity" or "RSV", as used herein, is the specific viscosity divided by concentration particularly as measured at concentrations of 0.45 grams of polymer in a one normal solution of sodium nitrate.

"Thickener" or "Settler" means a vessel used to effect a solid-liquid separation of a slurry, often with the addition of flocculants, the vessel constructed and arranged to receive a slurry, retain the slurry for a period of time sufficient to allow solid portions of the slurry to settle downward (underflow) away from a more liquid portion of the slurry (overflow), decant the overflow, and remove the underflow. Thickener underflow and thickener overflow are often passed on to filters to further separate solids from liquids.

"Weight Percent Ratio" means the total weight fraction of one reagent within 100 grams of the composition or mixture.

In the event that the above definitions or a description stated elsewhere in this application is inconsistent with a meaning (explicit or implicit) which is commonly used, in a dictionary, or stated in a source incorporated by reference into this application, the application and the claim terms in particular are understood to be construed according to the definition or description in this application, and not according to the common definition, dictionary definition, or the definition that was incorporated by reference. In light of the above, in the event that a term can only be understood if it is construed by a dictionary, if the term is defined by the *Kirk-Othmer Encyclopedia of Chemical Technology*, 5th Edition, (2005), (Published by Wiley, John & Sons, Inc.), this definition shall control how the term is to be defined in the claims.

Described herein are methods and compositions using boronic acid-containing polymers for improving flocculant effectiveness and efficiency in industrial processes. In at least some embodiments, a boronic acid-containing polymer component (or "Boronic Polymer Component") is combined with a flocculating agent component (or "Flocculating Agent Component") on-site or in situ to form a mixture. The mixture is combined with or introduced into alkaline fluid having a pH of 8 or more. The pH of the alkaline fluid triggers a cross-linking reaction between the Flocculating Agent Component and the Boronic Polymer Component forming a reaction product. The triggering can be performed prior to or upon introduction into a fluid stream of an industrial process, such as a Bayer process. The reaction product is used in solid-liquid separation in the industrial process.

The pH triggered reaction of the methods disclosed herein, whether prior to introduction/application into the fluid stream or in situ, is an improvement over longer preparation and reaction times of other flocculants, flocculation agents or flocculating methods. The inventive methods of application provide greater flexibility and the ability to make quick alterations in addressing differing dosage applications. The methods further provide for reduced transportation and storage costs.

In at least some embodiments, Flocculant Components, such as boronic acid-containing polymer and dextran, are reacted or cross-linked in situ. That is, the Flocculant Components are provided separately and are reacted or cross-linked in a fluid stream at the site of application to form the flocculant. The Flocculant Components are mixed and added to the fluid stream of the particular subject process. The pH of the fluid stream, which is 8 or more, triggers the cross-linking of the mixed Flocculant Components. In the case of the Bayer process, in some embodiments, the Flocculant Components are added to the Bayer liquor in a trihydrate classification circuit of the alumina trihydrate production process. The Flocculant Components can be added to the liquor at one or more locations in the Bayer process where solid-liquid separation occurs.

In some embodiments, the reaction or cross-linking involves mixing the components with an amount of alkaline solution having a pH of 8 or more, for example, an amount of the fluid stream of the particular subject process. The pH of the alkaline solution triggers the cross-linking of the Flocculant Components forming the boronic acid-containing polymers. The reacted or cross-linked Flocculant Components are then added directly to the fluid stream. In the case of the Bayer process, in some embodiments, an amount of the alkaline Bayer liquor from the fluid stream of the site Bayer process can be used. The reacted or cross-linked Flocculant Components in the amount of the alkaline Bayer liquor is then added directly to the Bayer liquor in a trihydrate classification circuit of the alumina trihydrate production process. The Flocculant Components can be added to the liquor at one or more locations in the Bayer process where solid-liquid separation occurs.

In at least one embodiment the Flocculant Components are added to liquor in a trihydrate classification circuit of the alumina trihydrate production process. The Flocculant Components can be added to the liquor at one or more locations in a Bayer process where solid-liquid separation occurs. In at least one embodiment, the Flocculant Components can be added to said liquor at one or more locations in a Bayer process where it inhibits the rate of nucleation of one or more alumina hydrate crystals in the process. In at least one embodiment, the Flocculant Components can be added to the liquor at one or more locations in a Bayer process where it reduces the rate of scale formation in the process. In at least one embodiment, the Flocculant Components can be added to the liquor at one or more locations in a Bayer process where it facilitates red mud clarification in the process.

Flocculant Components

In at least some embodiment, the Flocculant Components comprise a Flocculating Agent Component or flocculating agent, which, in exemplary embodiments, is a polysaccharide, and a Boronic Polymer Component, which, in exemplary embodiments, is a boronic acid-containing polymer. The components undergo a cross-linking reaction in response to a pH trigger to form the flocculant composition. In some embodiments, the cross-linking time in preparation of the improved flocculant is 1-30 minutes. The efficiency of the pH-triggered crosslinking of the present invention allows this reaction to conducted on-site or in-situ, while conventional crosslinking of polysaccharides is performed off-site for a duration of 1-20 hours. The cross-linked flocculant composition works as a process additive to enhance settling and efficiency in a separation process. In some various embodiments, the pH trigger can be a solution having a pH in the ranges of 8 or higher, including process fluid from the industrial process. In some embodiments, the industrial process is a Bayer process and the cross-linked Flocculant Components are used in the process liquor to enhance the settling of fine alumina trihydrate crystals and reduce the amount of solids in spent liquor.

Flocculating Agent Component

In various embodiments, the Flocculating Agent Component comprises a flocculating agent, which, in at least some embodiments, can be a synthetic polymer, a polysaccharide, or mixtures thereof. In some embodiments, the flocculating agent contains one or more polysaccharides. The polysaccharides can comprise glucose monosaccharides, including, for example, one or mixtures of dextran, starch, guar gum, dihydroxypropyl cellulose, pullulan, scleroglucan, zooglan, lactam, rhamsan, etc. In at least some embodiments, the flocculating agent is soluble or dispersible in the process liquid, such as dextran in Bayer process liquor, and can be added alone as a process additive.

Boronic Polymer Component

In various embodiments of the invention, the Boronic Polymer Component comprises one or more boronic acid-containing polymers (or "Boronic Polymer(s)") and can be a biopolymer or a synthetic polymer. The boronic acid containing polymer can be synthesized via or the reaction product of polymerization, such as free-radical polymerization, of at least one water soluble vinyl monomer and at least one vinyl monomer containing a boronic acid moiety ("Boronic acid monomer").

In at least some embodiments, examples of suitable water soluble vinyl monomers including acrylamide; acrylic acid or its salts; 2-Acrylamido-2-methylpropane sulfonic acid or its salts (AMPS or ATBS); N,N,N-Trimethyl-2-[(1-oxo-2-propenyl)oxy]-ethanaminium chloride (DMAEA.MCQ), N,N-dimethyl-N-propenyl-2-propen-1aminium chloride (DADMAC) and mixtures thereof.

In at least some embodiments, the Boronic acid monomer includes at least one vinyl group and a boronic acid moiety. In these and various other embodiments, the boronate moiety is provided by substituted phenylboronic acids (PBA). Examples of suitable Boronic acid monomers include, but are not limited to, 3-(Acrylamido)phenylboronic acid (APBA), 4-(acrylamido)phenylboronic acid, 2-(acrylamide) phenylboronic acid, 4-Vinylphenylboronic acid, 3-vinylphenylboronic acid, 2-vinylphenylboronic acid and mixtures thereof.

In these and various embodiments, the synthesized boronic acid containing polymer can have one or more of the following properties: nonionic, anionic, cationic, amphoteric, and associative. The boronic acid containing polymer further can be linear or non-linear and can be cross-linked or non-cross-linked.

In some embodiments, including embodiments used in a Bayer process, the Boronic Polymer is water soluble boronic acid-containing polyacrylamide. The polyacrylamide can be prepared from radical polymerization of acrylamide (water soluble vinyl monomer) and a Boronic acid monomer (at least one vinyl monomer containing a boronic acid moiety).

In the above and other various embodiments, the water soluble vinyl monomer (acrylamide) can be replaced or combined with a water soluble vinyl monomer chosen from group consisting of: acrylic acid or its salts, 2-Acrylamido-2-methylpropane sulfonic acid (AMPS) or its salts, 2-(acryloyloxy)-N,N,N-trimethylethanaminium (DMAEA.MCQ), N,N-dimethyl-N-propenyl-2-propen-1aminium chloride (DADMAC) and mixtures thereof.

In the above and other various embodiments, the Boronic acid monomer can be 3-(Acrylamido)phenylboronic acid (APBA), 4-(acrylamido)phenylboronic acid, 2-(acrylamide) phenylboronic acid, 4-Vinylphenylboronic acid, 3-vinylphenylboronic acid, 2-vinylphenylboronic acid or mixtures thereof.

In at least one embodiment, the Boronic Polymer is prepared from radical polymerization of a water soluble vinyl monomer and APBA. In this and other various embodiments, the water soluble vinyl monomer can be chosen from a group consisting of: acrylamide (AM), acrylic acid or its salts (AA), 2-Acrylamido-2-methylpropane sulfonic acid or its salts (AMPS or ATBS), 2-(acryloyloxy)-N,N,N-trimethylethanaminium (DMAEA.MCQ), N,N-dimethyl-N-propenyl-2-propen-1aminium chloride (DADMAC) and mixtures thereof.

In at least some embodiments, the Boronic Polymer comprises at least 0.01% Boronic acid monomer. In further embodiments, the Boronic Polymer comprises about 0.5 wt % to about 2.5 wt % Boronic acid monomer with the remaining comprising the water soluble vinyl monomer(s). In at least some embodiments, the Boronic Polymer comprises about 1.0 wt % to about 2.0 wt % Boronic acid monomer. In some embodiments, the Boronic Polymer comprises 1.0 wt % to about 2.0 wt % Boronic acid monomer and about 98.0 wt % to about 99 wt % water soluble vinyl monomer(s).

In these and other various embodiments, the Boronic Polymer Component can have an RSV in the range of about 0.2 dl/g to about 50 dl/g. In some embodiments, the range is about 0.2 dl/g to about 35 dl/g. In further embodiments, the range is about 1.0 dl/g to about 35 dl/g. In still further embodiments, the range is about 5 dl/g to about 30 dl/g.

The boronic acid containing polymer can be provided or delivered in various forms. Examples of such forms include latex, aqueous solution, or dry powder form.

Flocculant Component Mixture

The Flocculating Agent Component and the Boronic Polymer Component are combined to form a mixture. In at least some embodiments, the mixture is formed by obtaining an amount of the Flocculating Agent Component and an amount of the Boronic Polymer Component and combining the components on-site at the mining production location. In some embodiments, the mixture is formed outside of the fluid stream of the production process. In some further embodiments, the mixture is formed in situ by adding the two components directly into the fluid stream of the production process. In still further embodiments, the mixture is obtained or delivered to the production site. In at least some embodiments, the components in the mixture remain unreacted until a reaction is pH triggered.

In at least some embodiments, the mixture comprises about 0.01 wt % to about 50 wt % Boronic Polymer Component with the remaining being Flocculating Agent Component. In some embodiments, the mixture comprises about 0.01 wt % to about 30 wt % Boronic Polymer Component. In still further embodiments, the mixture comprises about 0.10 wt % to about 10 wt % Boronic Polymer Component. In at least some embodiments, mixtures with a Boronic Polymer Component having a higher RSV comprise amounts of the Boronic Polymer Component at lower ends of the ranges.

Flocculant Cross-Linking Reaction

The mixture is thereafter exposed to a pH of 8 or more to trigger a cross-linking reaction between the Flocculating Agent Component and the Boronic Polymer Component. In some embodiments, the mixture is triggered by exposing the mixture to a pH of 10 or more. Upon exposure, the components undergo a cross-linking reaction to form the flocculant composition. In some embodiments, the reaction time or cross-linking time in preparation of the improved flocculant is 1-30 minutes, as compared to commercial products, which is 1-20 hours.

In at least some embodiments, the flocculant is prepared by forming the mixture and thereafter introducing the mixture into a fluid stream of the production process at one or more locations where solid-liquid separation occurs. The cross-linking reaction of the components of the mixture to form the flocculant is triggered in situ by the pH of 8 or more of the fluid stream.

In at least some embodiments, both the mixture of the components is formed and the cross-linking reaction of the components of the mixture is triggered in situ by the pH of 8 or more of the fluid stream. In such a case, the flocculant is prepared by introducing the first and second components individually into the fluid stream of the production process at one or more locations where solid-liquid separation occurs. The components are introduced in such a manner so that the first and second components intermingle in the fluid stream. The mixture is thereby formed in the fluid stream. The fluid stream has a pH of 8 or more, triggering the cross-linking reaction of the components to form the flocculant.

In some embodiments, the mixture is formed and the cross-linking reaction of the flocculant components of the mixture is triggered prior to introduction into a fluid stream of the production process. In some embodiments, the flocculant components are exposed to a pH of 8 or more during the formation of the mixture. In some embodiments, the mixture of the flocculant components is formed and subsequently exposed to a pH of 8 or more. After or during the cross-linking reaction, the mixture is then introduced into the fluid stream of the production process at one or more locations where solid-liquid separation occurs.

In some embodiments, the triggering of the cross-linking reaction of the flocculant components prior to introduction into a fluid stream of the production process is performed by combining an amount of a solution having a pH of 8 or more with the flocculant components or the mixture of the flocculant components. In some embodiments, the solution is added to one or both of the components, wherein the components are thereafter combined. In at least some embodiments, the solution having a pH of 8 or higher is an amount of fluid from the production process. In some embodiments, the industrial production process is a Bayer process and the fluid used as the triggering fluid is process liquor.

In some embodiments, a mixture of a boronic acid containing polymer and a flocculating agent can be provided, wherein the boronic acid containing polymer and a flocculating agent in the mixture are unreacted, can be delivered to the location of application. The mixture can be pH triggered outside the fluid stream and thereafter introduced into the fluid stream or by introducing the mixture directly into the fluid stream, such that the pH triggered cross-linking occurs in situ.

In at least some embodiments, the industrial process is a Bayer process for the production of alumina from bauxite ore. In such and various embodiments, the invention relates to the use of a trihydrate flocculant to improve the performance of unit operations within the Bayer process, in particular to enhance the settling of fine alumina trihydrate crystals. The trihydrate flocculant can be made by pH triggered crosslinking of dextran with boronic acid-containing polymers. The crosslinking can be performed on-site or in situ, using available Bayer process liquor as the pH trigger.

In at least one embodiment, a cross-linked dextran and boronic acid-containing polymer is blended by addition of boronic acid-containing polymer to dextran to form a solution, wherein the boronic acid-containing polymer and dextran are largely unreacted. The unreacted solution is then added to an alkaline solution containing sodium hydroxide, potassium hydroxide, or other alkali metals or water soluble alkaline earth metal hydroxide and having a pH in the range of 8 to 14. The pH of the alkaline solution triggers cross-linking reaction of the boronic acid-containing polymer and dextran. In some embodiments, the solution becomes a highly viscous solution or paste. In some embodiments, appropriate cross-linking is achieved as measured by an increase in the solution viscosity.

In some embodiments of the invention, use of the methods herein enhances the production and recovering of crystal agglomerates from a precipitation liquor crystallization process. The use of the cross-linked dextran in accordance with the present invention, effectuates an increase in particle size of the crystal agglomerates recovered compared to other conventional methods.

Embodiments further include a method for the production of aluminum hydroxide from a Bayer process liquor containing an aqueous phase of sodium aluminate. The liquor can be produced by separation of caustic-insoluble suspended solids. The method can include the steps of (i) introducing amounts of dextran and boronic acid-containing polymer in accordance with the present invention to precipitation liquor of the Bayer process and distributing such through the precipitation liquor; and (ii) precipitating crystal agglomerates from the precipitation liquor. In the method, dextran and boronic polymer are added in an amount effective to shift the particle size distribution of aluminum hydroxide crystals so that the resulting crystals have a reduced formation of product fines.

In embodiments of the methods, the dextran and boronic acid-containing polymers can be added in accordance with the methods of the presenting invention to the precipitation liquor in one or more of the following phases of the Bayer process: (i) to a precipitation feed liquor; (ii) to a seed slurry; (iii) into a precipitation tank; and (iv) into an existing input stream of a precipitation tank. In some embodiments, the components are distributed within the precipitation liquor by the means of conventional, high shear, or ultrasonic mixing.

In some embodiments, components added in accordance with the present disclosure to a Bayer process for producing aluminum hydroxide crystals effectuate a reduced formation of product fines concurrent with an upward shift in the particle size distribution of aluminum hydroxide, without substantial reduction in the overall product yield of aluminum hydroxide.

In at least one embodiment, the present invention comprises a chemical additive kit for solid-liquid separation in a mining process. The chemical additive kit comprises: a first composition comprising a polysaccharide and a separate second composition comprising a boronic acid-containing polymer. The polysaccharide and boronic acid-containing polymer of the first and second components, when combined with an amount of liquor or slurry from the mining process having a pH level of 8 or more, undergo an instantaneous cross-linking reaction triggered by the pH level of the liquor or slurry to form a reaction product for use in a fluid stream of the mining process at one or more locations where solid-liquid separation occurs. The chemical additive kit further comprises instructions for using the first and second composition in solid-liquid separation in the mining process. In further embodiments, the polysaccharide is dextran and the boronic acid-containing polymer is a water soluble boronic acid-containing polyacrylamide. In some embodiments, the mining process is a Bayer process or an iron ore tailing process.

In at least one embodiment, the present invention comprises a commercial package. The commercial package comprises: a first composition comprising a polysaccharide and a separate second composition comprising a boronic acid-containing polymer; and labeling having printed instructions indicating the use thereof as a solid-liquid separation additive in the mining process, such as a Bayer process. The polysaccharide and boronic acid-containing polymer of the first and second components, when combined with an amount of liquor or slurry from the mining process having a pH level of 8 or more, undergo an instantaneous cross-linking reaction triggered by the pH level of the liquor or slurry to form a reaction product for use in a fluid stream of the mining process at one or more locations where solid-liquid separation occurs. In these and other various embodiments, the commercial package further comprises instructions for use. In further embodiments, the polysaccharide is dextran and the boronic acid-containing polymer is a water soluble boronic acid-containing polyacrylamide.

In at least one embodiment, the present invention is directed to a method of marketing the first composition comprising a polysaccharide and separate second composition comprising a boronic acid-containing polymer, comprising packaging the first and second compositions along with labeling that identifies the compositions as being useful as a solid-liquid separation additive in the mining process, such as a Bayer process. In further embodiments, the polysaccharide is dextran and the boronic acid-containing polymer is a water soluble boronic acid-containing polyacrylamide.

By cross-linking the dextran with boronic acid-containing polymer, superior and unexpected improvements are observed in the activity of cross-linked material when compared to conventionally crosslinked polysaccharides or the uncross-linked analogs. Uses of polysaccharides are impaired by the fact that increasing dosages of polysaccharides in Bayer liquor result in superior flocculation only up to a maximum dosage. After the maximum dosage has been reached, further addition of such polysaccharide material typically produces no further performance improvement.

When the cross-linked dextran of the present invention is used, superior performance can be achieved. Surprisingly, the maximum performance of cross-linked dextran in accordance with the present invention is superior to the maximum performance using conventional dextran at any dose.

Methods and compositions disclosed herein are useful for a variety of applications. Such applications include, but are not limited to, alumina trihydrate flocculation, red mud flocculation, underflow rheology, overflow clarity, settling rate, and filtration rate of Bayer Process applications; iron ore and lead-zinc ore mining applications.

In these and various embodiments, the compositions and/or methods herein can be added and/or performed in combination with or according to any of the compositions and methods disclosed in U.S. Pat. Nos. 8,298,508 and 8,252,266 and publication WO 2014158381, including those related to flocculation and other applications disclosed herein. Also included are those patent related to the use of dextran, including U.S. Pat. Nos. 6,726,845, 6,740,249, 3,085,853, 5,008,089, 5,041,269, 5,091,159, 5,106,599, 5,346,628 and 5,716,530 and Australian Patents 5310690 and 737191. Methods, terms, tools, materials and teachings disclosed in referenced patents and publications and any others that are otherwise referenced below or otherwise in this disclosure are herein incorporated by reference. The art described herein is not intended to constitute an admission that any patent, publication or other information referred to herein is "prior art" with respect to this invention, unless specifically designated as such. In addition, this should not be construed to mean that a search has been made or that no other information as defined in 37 CFR § 1.56(a) exists.

EXAMPLES

The foregoing may be better understood by reference to the following examples, which are presented for purposes of illustration and are not intended to limit the scope of the invention. In particular, the examples demonstrate representative examples of principles innate to the invention and these principles are not strictly limited to the specific conditions recited in these examples. As a result it should be understood that the invention encompasses various changes and modifications to the examples described herein and such changes and modifications can be made without departing from the spirit and scope of the invention and without diminishing its intended advantages. It is therefore intended that such changes and modifications be covered by the appended claims.

A series of studies were conducted on the pH triggered cross-linking reaction of and the interaction between Boronic Polymers and dextran and the cross-linked product's effect in flocculation applications, in accordance with the present invention. Various Boronic Polymer samples (or "Polymer Samples"), as listed in Table 1, were prepared and cross-linked with dextran and compared in various settling tests, as further described below. The Boronic Polymer Samples comprise APBA as the Boronic acid monomer, in amounts listed in Table 1, and comprise AM, AA, AA/AM, or ATBS as the water soluble vinyl monomer, in amounts listed in Table 1. The Polymer Sample solutions were nonionic, cationic or anionic.

Cross-linking of the Boronic Polymers and dextran occurs instantaneously upon mixing at pH 8 or above. Four nonionic Boronic polymers, including Samples A, B, C and D, each comprising AM as the water soluble vinyl monomer and having RSV values as shown below in Table 1, were separately combined with UHMW dextran ("DX" or "dextran") An increase in viscosity was observed for each dextran/Boronic Polymer solution at pH>10.

TABLE 1

APBA Containing Polymers for dextran Crosslinking

| Boronic Polymer Samples (SC) | Water Soluble Vinyl Monomer | APBA % | Reduced Specific Viscosity (RSV, dL/g) |
|---|---|---|---|
| Sample A (nonionic) | 100% AM | 1.0 | 17.6 |
| Sample B (nonionic) | 100% AM | 1.0 | 14.0 |
| Sample C (nonionic) | 100% AM | 1.0 | 15.4 |
| Sample D (nonionic) | 100% AM | 1.8 | 8.6 |
| Sample E (nonionic or anionic) | 100% AM | 1 | 19.3 |
| Sample F (nonionic or anionic) | 8% ATBS | 1 | 17.0 |
| Sample G (cationic) | 50% cat | 1 | 21.8 |
| Sample H (anionic) | 30% AA/ 70% AM | 1 | 32.5 |

Example Settling Tests

Settling tests were also conducted on samples of dextran cross-linked with Boronic Polymers and samples of unmodified dextran to assess and compare flocculation performance. Samples of Boronic Polymer cross-linked dextran products in accordance with the present invention were assessed and compared to commercial polymer programs. The performance of Boronic Polymer cross-linked dextran was assessed as a flocculant for aluminum trihydrate and red mud in Bayer process and iron ore tailings in slurries of iron ore processing. Testing methods include Cylinder Test for Aluminum Trihydrate Settling; Cylinder Test for Red Mud Settling; and Cylinder Test for Iron Ore Tailing Settling. Protocols for these testing methods are as follows:

Cylinder Test for Aluminum Trihydrate Settling:

In the cylinder test, 200 ml bottles of Bayer spent liquor (Bayer process liquor with total caustic 233.6 g/l as $Na_2CO_3$) are collected and stored in a water bath at 60° C. For a test sample, a bottle is removed from the water bath and 10 g aluminum trihydrate fine seed (aluminum trihydrate standard seed, commercially available from RJ Marshall Co, USA) is added into the liquor (50 g/l aluminum trihydrate solids). The bottle is then shaken to suspend the hydrate solids for 30 seconds, and then dosed with a specific amount of flocculant solution containing a flocculant sample. The bottle is then mixed by hand to allow the flocculant sample to contact the solids for 1.0 minute. The resulting slurry is then transferred into a 250 ml graduated cylinder. The amount of solids in the overflow of each sample is determined after 3 minutes of settling by taking 60 ml of supernatant from the top of the cylinder and filtering it through a glass fiber filter paper.

Cylinder Test for Red Mud Settling:

In the cylinder test, 1000 ml of Bayer process slurry containing red mud is collected in a cylinder. For a given test sample, the slurry is dosed with a specific amount of a sample flocculant solution and then mixed to allow the flocculant to contact the solids. A timer is started once mixing is stopped. At an assigned time "t", record the interface position to estimate the hydrate settling rate.

Cylinder Test for Iron Ore Tailing Settling:

In the cylinder test, 1000 ml of iron ore tailing slurry is collected in a cylinder. For a given test sample, the slurry is dosed with a specific amount of a sample flocculant solution and then mixed to allow the flocculant to contact the solids. A timer is started once mixing is stopped. At an assigned time "t", record the interface position to estimate the hydrate settling rate.

Sample Testing:

Example 1

Cylinder Testing for Aluminum Trihydrate Settling was conducted on aluminum trihydrate in Bayer liquor. Samples A1, B1, C1 and D1 were tested and compared to dextran (Sample DX) (UHMW dextran), HyClass flocculant (sample HC), which is commercially available Nalco Company in Naperville, Ill., and a blank. Samples A1, B1, C1 and D1 are the cross-linking reaction products of dextran and each of Samples A, B, C and D, respectively. FIG. 1 illustrates the percent of reduction of overflow solids with the addition of equal dosages of the samples (DX, A1, B1, C1, D1 and HC). The level of active dextran was 3.25 ppm.

As shown in FIG. 1, surprisingly it was found that significant performance improvement was observed after cross-linking over the dextran sample, which was not cross-linked. More surprisingly, Sample A1, which is dextran cross-linked with Sample A, which has the highest RSV of Samples A-D, performed similarly to the commercial product. This is at least significant in terms of efficiency due to the markedly reduced cross-linking time required for Samples A1-D1, which, in some embodiments, is 1-30 minutes, as compared to commercial products, which is 1-20 hours.

Example 2

Cylinder Testing for Aluminum Trihydrate Settling was conducted to illustrate the impact of percent of Boronic Polymer incorporation on the performance of cross-linked dextran in aluminum trihydrate flocculation. Two samples (A2A, A2B) were compared with dextran (Sample DX). Samples A2A and A2B are dextran cross-linked with Sample A. The Boronic Polymer cross-linked dextran (A2A, A2B) were made at different ratios of Boronic Polymer to dextran. Sample A2B had a higher ratio (6% Boronic Polymer) than Sample A2A (0.6% Boronic Polymer). Bayer spent liquor was used as the process fluid and aluminium trihydrate seed was used as the flocculant substrate.

Figure 2:
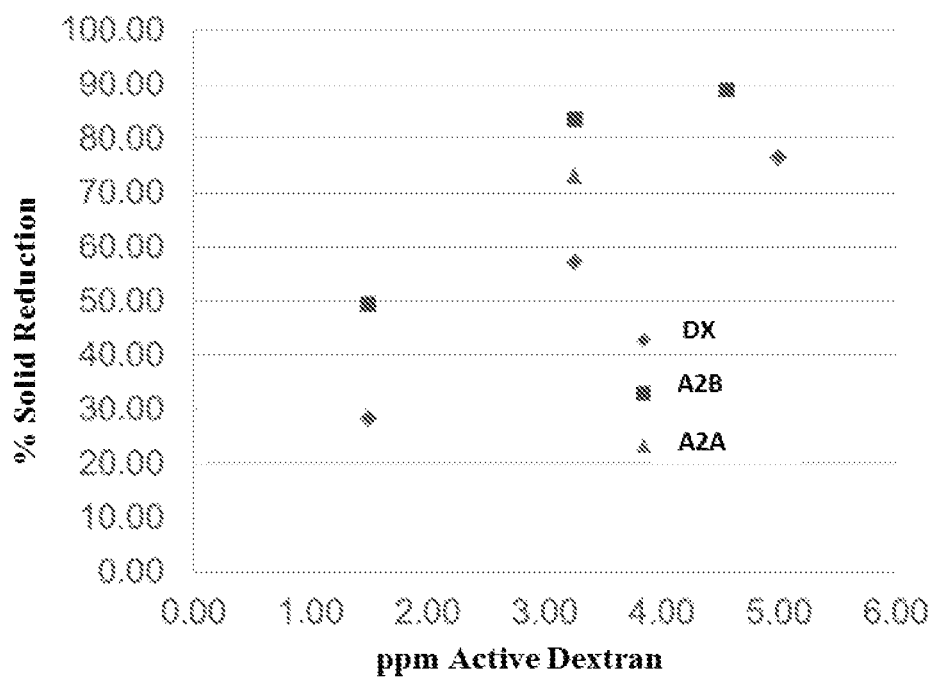
FIG. 2 is a graph showing results from a comparison of samples in an overflow solids reduction test.

As shown in FIG. 2, the cross-linked dextran with higher percent of incorporation of Boronic Polymer (Sample A2B) outperformed the cross-linked dextran (Sample A2A) with lower percent of boronic polymer incorporation.

Example 3

Figure 3:
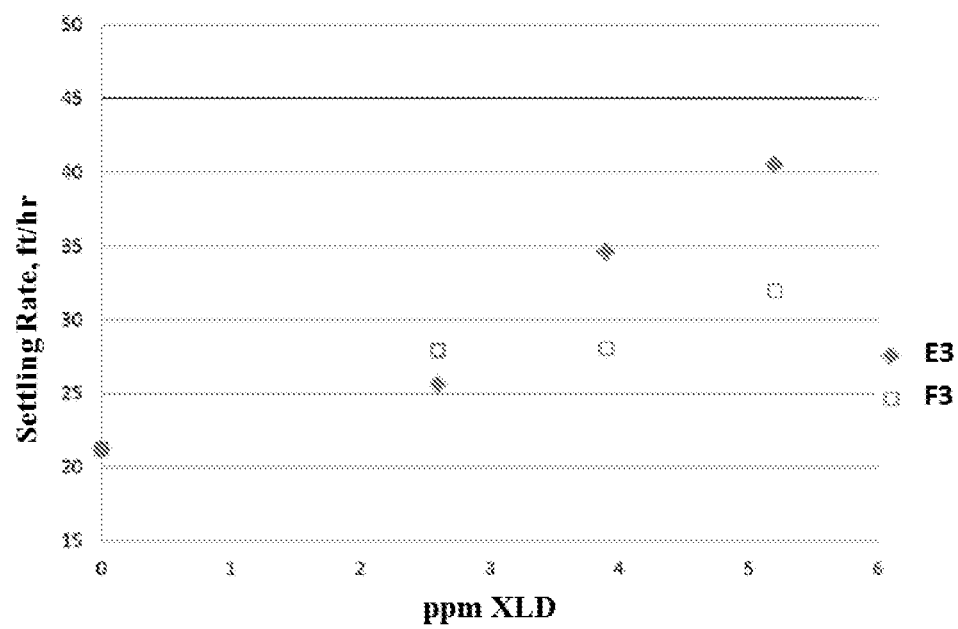
FIG. 3 is a graph showing results of from a comparison of co-addition samples in a red mud settling test.

Cylinder Testing for Red Mud Settling was conducted to illustrate effectiveness of Boronic Polymers in Red Mud (Bayer process red mud) flocculation applications. Three cross-linked dextran samples (E3, F3) cross-linked from nonionic or anionic Boronic Polymers, Samples E and F, respectively, were prepared and tested. During the testing, the cross-linked dextran (Samples E3 and F3) were co-dosed with conventional red mud flocculant (RF). In FIG. 3, the x-axis (ppmXLD) indicates the level of addition (increased dosages) of dextran cross-linked with Boronic Polymer samples E3 and F3 in ppm. "0" at the left end of the x-axis indicates conventional red mud flocculant alone (RF). The co-addition of the conventional flocculant (RF) was done at fixed concentrations.

As shown in FIG. 3, compared to conventional red mud flocculant alone (x=0), significant improvement in settling rate (from 20 ft/hr to 40 ft/hr) was observed with co-addition of conventional red mud flocculant and cross-linked dextran.

Example 4

Cylinder Testing for Iron Ore Tailing Settling was conducted to illustrate effectiveness of Boronic Polymers in iron ore tailing flocculation applications. Settling tests were conducted on an iron ore tailing slurry comparing co-dosing conventional flocculent (CF) with dextran cross-linked with Boronic Polymers (G4) and co-dosing the same conventional flocculent (CF) with a conventional coagulant (CC). The conventional flocculent (CF) was Optimer® 83949 Flocculant, which is an anionic flocculent and is commercially available Nalco Company in Naperville, Ill.; the conventional coagulant (CC) was CAT-FLOC 8799 PLUS, which is cationic and is commercially available Nalco Company in Naperville, Ill.; and the dextran cross-linked with Boronic Polymers (G4) was the dextran sample (DX) cross-linked with Boronic Polymer Sample G (see Table 1). The convention flocculent (CF) was held at a fixed concentration and G4 and CC were each applied and measured at different dosages, as indicated and measured in ppm on the x-axis (ppm cat polymer).

Figure 4:
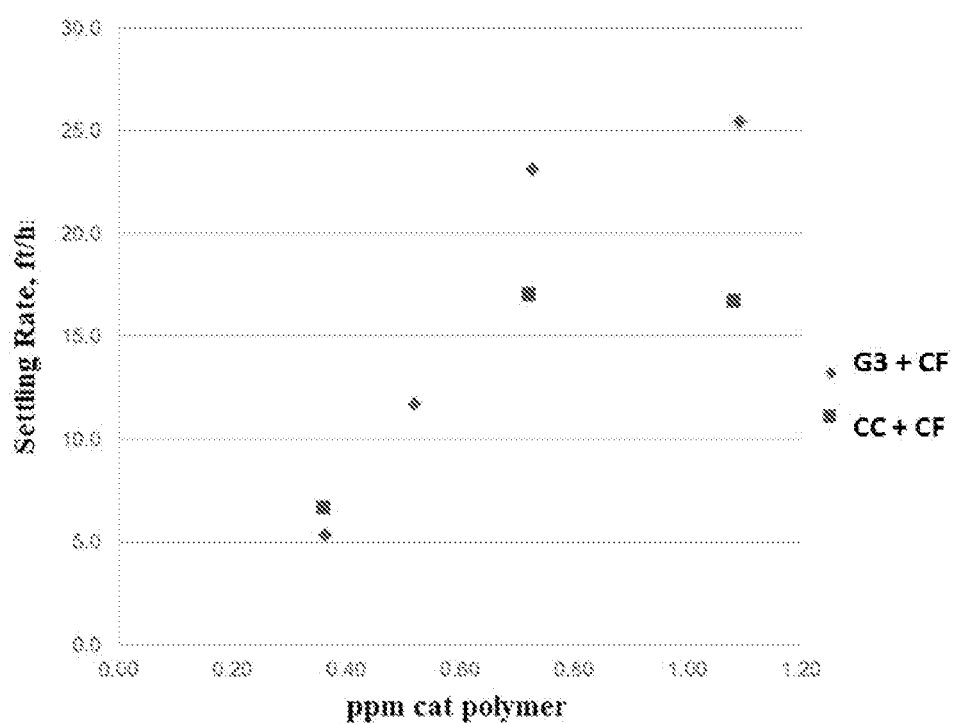
FIG. 4 is a graph showing results of from a comparison of co-addition samples in an iron ore tailing settling test.

As seen in FIG. 4, it is apparent that co-dosing of cationic Boronic Polymer cross-linked dextran (G4) with conventional anionic flocculant (CF) demonstrated significant performance improvement (higher settling rate) in iron ore tailing flocculation, as compared to the conventional co-dosing of conventional cationic coagulant (CC) and conventional anionic flocculant (CF).

As shown in the above examples 1-4, significant performance improvements are seen in mining settling applications when dextran is cross-linked with Boronic Polymers, as provided herein. The performance combined with the in situ application and instantaneous reaction advantages of the methods and compositions of the present invention provide for substantive improvements over conventional flocculant processes. The efficacy and efficiency of the methods and compositions disclosed herein provide for reduced costs and equal or improved performance optimized dosage.

While this invention may be embodied in many different forms, there are shown in the drawings and described in detail herein specific embodiments of the invention. The present disclosure is an exemplification of the background and principles of the invention and is not intended to limit the invention to the particular embodiments illustrated. All patents, patent applications, scientific papers, and any other referenced materials mentioned anywhere herein are incorporated by reference in their entirety for all purposes, including in providing materials, formulations, formulation methods and methods for making, performing and using as they relate to the methods and compositions of the present invention. Furthermore, the invention encompasses any possible combination of some or all of the various embodiments described herein and incorporated herein.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

References to "embodiment(s)", "disclosure", "present disclosure", "embodiment(s) of the disclosure", "disclosed embodiment(s)", and the like contained herein refer to the specification (text, including the claims, and figures) of this patent application that are not admitted prior art.

All ranges and parameters disclosed herein are understood to encompass any and all subranges subsumed therein, and every number between the endpoints. For example, a stated range of "1 to 10" should be considered to include any and all subranges between (and inclusive of) the minimum value of 1 and the maximum value of 10; that is, all subranges beginning with a minimum value of 1 or more, (e.g. 1 to 6.1), and ending with a maximum value of 10 or less, (e.g. 2.3 to 9.4, 3 to 8, 4 to 7), and finally to each number 1, 2, 3, 4, 5, 6, 7, 8, 9, and 10 contained within the range.

Various embodiments of the present invention have been described. Nevertheless, it will be understood that various modifications may be made without departing from the spirit and scope of the invention. Those skilled in the art may recognize other equivalents to the specific embodiment described herein which equivalents are intended to be encompassed by the claims attached hereto. For purposes of interpreting the claims for the present invention, it is expressly intended that the provisions of Section 112, sixth paragraph of 35 U.S.C. are not to be invoked unless the specific terms "means for" or "step for" are recited in a claim.

The invention claimed is:

1. A method for solid-liquid separation in a mining process, the method comprising:
combining a first composition with a fluid stream of a mining process to form a first combined fluid stream, the first composition comprising a boronic acid-containing polymer, the fluid stream having a pH of 8 or more;

combining a second composition with the first combined fluid stream to form a second combined fluid stream, the second composition comprising a polysaccharide; and separating a solid from the second combined fluid stream.

2. The method of claim 1 wherein the boronic acid-containing polymer comprises at least one polymerized water soluble vinyl monomer and at least one polymerized vinyl monomer containing a boronic acid moiety.

3. The method of claim 2 wherein at least one water soluble vinyl monomer is acrylamide and the boronic acid-containing polymer is a water soluble boronic acid-containing polyacrylamide.

4. The method of claim 1 wherein the boronic acid-containing polymer has a reduced specific viscosity of at least about 0.2 dl/g.

5. The method of claim 1 wherein the first composition is combined in the form of latex, an aqueous solution or a dry powder.

6. The method of claim 1, wherein a reaction product of the polysaccharide with the boronic acid-containing polymer inhibits the rate of nucleation of one or more alumina trihydrate crystals in the Bayer process.

7. The method of claim 1, wherein a reaction product of the polysaccharide with the boronic acid-containing polymer facilitates red mud clarification in the Bayer process.

8. A method for solid-liquid separation in a mining process, the method comprising:
mixing a boronic acid-containing polymer with a polysaccharide to form an unreacted mixture,
adding the unreacted mixture to a fluid stream of a mining process, the fluid stream having a pH of 8 or more, to form a reaction product of the boronic acid-containing polymer and the polysaccharide; and
separating a solid from the fluid stream.

9. The method of claim 8 wherein the unreacted mixture is an aqueous solution.

10. The method of claim 8 wherein the mining process is a Bayer process.

11. The method of claim 10 wherein the separating is nucleating one or more alumina trihydrate crystals.

12. The method of claim 10 wherein the separating is clarifying red mud in the Bayer process.

13. The method of claim 8 where in the mining process is an iron ore process.

14. The method of claim 13 wherein the separating is separating iron ore tailing.

15. A method for solid-liquid separation in a mining process, the method comprising:
combining a first composition with a fluid stream of a mining process to form a first combined fluid stream, the first composition comprising a polysaccharide, the fluid stream having a pH of 8 or more;
combining a second composition with the first combined fluid stream to form a second combined fluid stream, the second composition comprising a boronic acid-containing polymer; and
separating a solid from the second combined fluid stream.

16. The method of claim 15 wherein the boronic acid-containing polymer comprises at least one polymerized water soluble vinyl monomer and at least one polymerized vinyl monomer containing a boronic acid moiety.

17. The method of claim 16 wherein at least one water soluble vinyl monomer is acrylamide and the boronic acid-containing polymer is a water soluble boronic acid-containing polyacrylamide.

18. The method of claim 15 wherein the boronic acid-containing polymer has a reduced specific viscosity of at least about 0.2 dl/g.

19. The method of claim 15 wherein the second composition is combined in the form of latex, an aqueous solution or a dry powder.

* * * * *